(12) United States Patent
Alanen et al.

(10) Patent No.: US 9,571,973 B1
(45) Date of Patent: Feb. 14, 2017

(54) DETERMINING DISTANCES

(71) Applicant: Nokia Technologies Oy, Espoo (FI)

(72) Inventors: Olli Alanen, Vantaa (FI); Janne Marin, Espoo (FI); Jarkko Kneckt, Espoo (FI); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/845,521

(22) Filed: Sep. 4, 2015

(51) Int. Cl.
 *H04W 4/04* (2009.01)
 *H04W 4/02* (2009.01)
 *H04W 48/16* (2009.01)

(52) U.S. Cl.
 CPC ............ *H04W 4/023* (2013.01); *H04W 48/16* (2013.01)

(58) Field of Classification Search
 CPC ............... H04M 1/72519; H04M 1/72522; H04M 1/0214; H04M 2250/12; H04W 88/02
 USPC ............... 455/412.2, 456.1–7, 458, 414.1, 443,455/446, 550.1–2
 See application file for complete search history.

(56) References Cited

U.S. PATENT DOCUMENTS

| | | | |
|---|---|---|---|
| 2013/0136117 A1* | 5/2013 | Schrum, Jr. ........... | H04W 88/06 370/338 |
| 2015/0245236 A1* | 8/2015 | Lu ....................... | H04W 52/265 370/252 |
| 2015/0282013 A1* | 10/2015 | Kim ..................... | H04L 65/1069 370/331 |
| 2016/0014715 A1* | 1/2016 | Patil .................. | H04W 52/0216 370/329 |

OTHER PUBLICATIONS

Wi-Fi Neighbor Awareness Networking (NAN) Technical Specification, Version 1.0, 2015 Wi-Fi Alliance, (98 pages).
IEEE P802.11, Wireless LANs, CIDs 1424, 1671, 1418 Regarding Fine Timing Measurement, IEEE 802.11-13/1178r0, Sep. 2013, (4 pages).

* cited by examiner

*Primary Examiner* — Cong Tran
(74) *Attorney, Agent, or Firm* — Harrington & Smith

(57) ABSTRACT

An apparatus and a method for determining distances between apparatuses are disclosed. The method in a first apparatus includes joining a network including a set of apparatuses; setting a first predetermined operating mode for the first apparatus after joining the network; receiving from at least one second apparatus belonging to the net-work a message indicating a support for a ranging service from the second apparatus. As a response to the message, a ranging process with the second apparatus is initiated. A second predetermined operating mode is set for the first apparatus after completing the ranging process with the second apparatus network; and a range-limited service discovery frame is broadcast.

15 Claims, 4 Drawing Sheets

DETERMINING DISTANCES

TECHNICAL FIELD

The invention relates to communications.

BACKGROUND

In wireless communication systems there may be situations for a transceiver when it might be useful to be able to know the location of another transceiver or distance to the transceiver.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

Embodiments of the present invention are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1A:
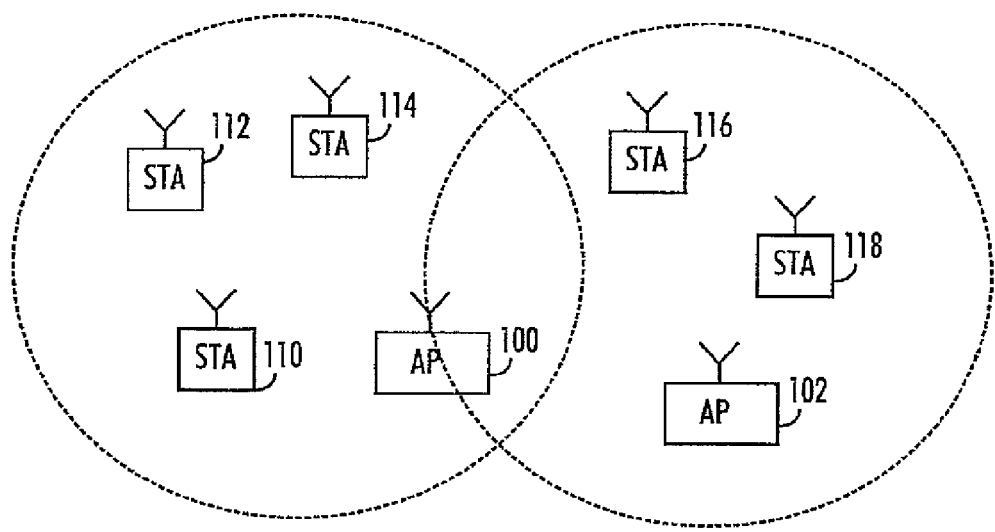
FIGS. 1A and 1B illustrate examples of wireless communication scenarios to which embodiments of the invention may be applied.

A general wireless communication scenario to which embodiments of the invention may be applied is illustrated in FIG. 1A. FIG. 1A illustrates an example of wireless communication devices comprising a plurality of access points (AP) 100, 102 and a plurality of wireless terminal devices (STA) 110, 112, 114, 116, 118. Each base station may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP. The APs 100, 102 may also provide access to other networks, e.g. the Internet. In another embodiment, the BSS may comprise a plurality of APs to form an extended service set (ESS). While embodiments of the invention are described in the context of the above-described topologies of IEEE 802.11 based networks, it should be appreciated that these or other embodiments of the invention may be applicable to networks based on other specifications, e.g. different versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards.

Let us consider an infrastructure BSS that includes an access point together with terminal devices. The access point may be configured to utilize one or more radio channels or frequencies in communication with the terminal devices. The access point 100, 102 is configured to inform terminal devices its presence by transmitting a beacon signal or a beacon frame at predetermined intervals on each channel it uses for communication. The beacon frame comprises information on the access point, its network, and other networks. Typically the predetermined interval is 100 time units (TU). The duration of one TU is 1,024 ms. A terminal device may tune to a channel and look for beacon frames. The process is denoted passive scanning. Upon finding a beacon frame the terminal device may attempt a connection with the access point by transmitting an authentication message. After receiving an authentication response message from the access point, the terminal device and the access point may exchange association messages after which the terminal device is said to be associated to the access point. The association messages may comprise at least one of the following messages: association request, association response, reassociation request, and reassociation response. The association may be followed by 802.1X authentication, IP address allocation and other application specific setup signaling.

Figure 1B:
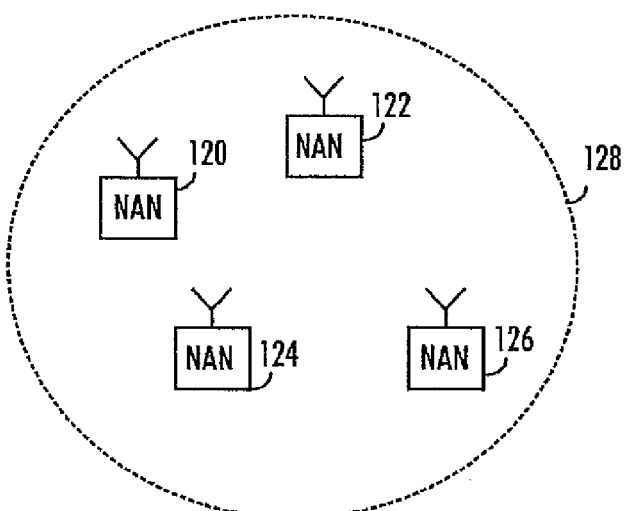

Another wireless communication scenario to which embodiments of the invention may be applied is illustrated in FIG. 1B. FIG. 1B illustrates a plurality of wireless devices 120, 122, 124, 126 that form a cluster 128 of devices. The cluster may comply with neighbour awareness networking (NAN) principles. NAN is also denoted as the Wi-Fi Aware. NAN provides a mechanism for wireless devices to synchronize the time and channel on which they converge to facilitate the discovery of services that the devices may offer to other devices. The time period and channel on which NAN Devices converge is called the Discovery Window (DW). The wireless devices of a NAN cluster share a common set of NAN parameters that may comprise the time period between consecutive Discovery Windows, the time duration of the Discovery Windows, a beacon interval, and NAN Channel(s). The devices in a cluster may transmit multicast NAN Service Discovery frames directly to other devices within range in the same cluster during the Discovery Window. Devices may also communicate one to one with each other. A wireless device may belong to more than one cluster. In addition, a device may operate concurrently in a cluster and in a different WiFi network such as an infrastructure BSS of FIG. 1A.

Some proposals have been made to enhance NAN. Especially a more accurate ranging has been proposed between the NAN devices. A NAN device may utilize the ranging result in filtering the service discovery frames. It has been proposed that a NAN device should be able to e.g. search for a Service IDs with a predetermined range (such as 30 meters, for example) and in this case, only the devices with the required Service ID and within the required range, should reply to the query.

One possible technology to realise ranging is based on IEEE 802.11 Fine Timing Measurement (FTM). In one exemplary realisation of FTM, typically three frame pairs are required to complete the ranging process. First the initiating apparatus transmits a request to initiate distance measurement. The responding apparatus acknowledges the request. Then follow the actual ranging messages between the apparatuses. Both stations time stamp the transmission and reception times of these messages. The time stamps may be denoted as t1, t2, t3, and t4. The responding apparatus is configured to transmit at time instant t1 an FTM_1 message. The initiating apparatus receives the message at time instant t2 and transmits acknowledgement message at time instant t3. The responding apparatus receives the ACK transmitted by the initiating apparatus at time instant t4.

Finally, the responding apparatus transmits an FTM_2 message to inform the initiating apparatus on the transmission time t1 of the FTM_1 message and the reception time t4 of the corresponding ACK. After this message exchange, the initiating apparatus can determine distance to the responding apparatus.

The numbers of NAN devices in a cluster (local network) may in some cases be quite large. One of the challenges is to make the ranging scalable in case where there are many nodes in the cluster. Currently the approach has been that each NAN device entering a cluster is to perform one-to-one discovery with each existing node of the cluster. A complete service discovery amongst all NAN devices may take a long time and would not therefore be practical.

Figure 2:
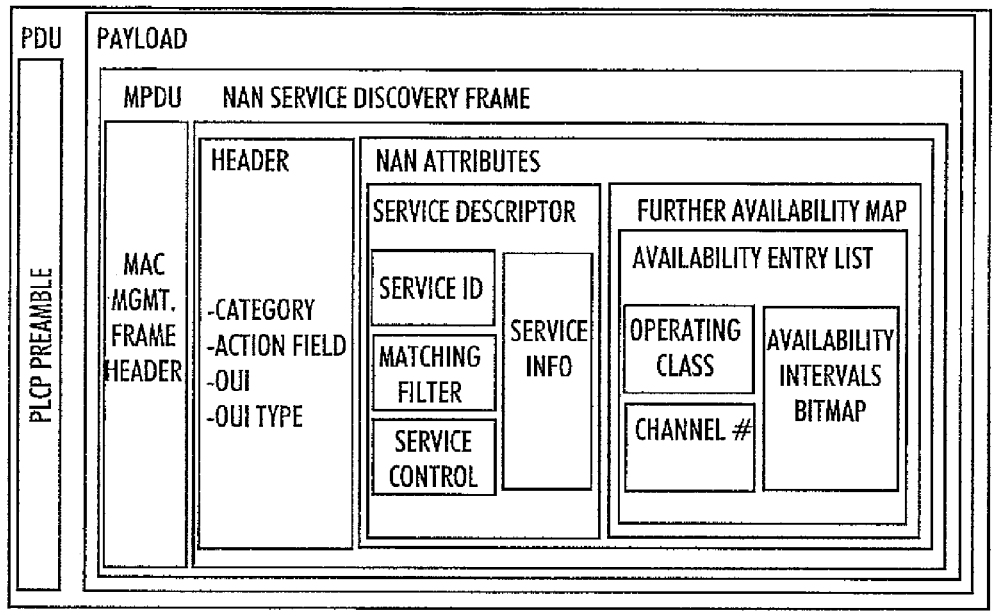
FIG. 2 illustrates an example of an advertisement protocol data unit.

In an embodiment, it is proposed that a cluster of NAN devices offers ranging service for NAN devices having just joined into the cluster. When a new NAN device joins a NAN cluster, it may be configured to first search for devices of the cluster offering the ranging service. In an embodiment, the location of the device(s) of the cluster offering the service is static or semi static. The NAN device of the cluster offering the ranging service may indicate the service in its Beacons or Service Discovery Frames. For example, a Service Name may be specific and advertised for indication. Alternatively, it may be indicated with a new attribute (such as WLAN infrastructure attribute) or capability and advertised. For example, if a Service Name is used as the indication, the actual advertisement protocol data unit PDU may look like one in FIG. 2. In the example, the Service ID may identify the ranging service and the Further Availability Map attribute may describe when the device is available for the ranging service.

Once one or more such devices advertising the service are found, the new NAN device may be configured to perform ranging with some of them. Other devices of the cluster may be configured to listen or observe for the ranging and calculate their distance to the new device based on the results.

At the next step, all the NAN devices of the cluster know their range to the new node and may thereafter reply to the range-limited service discovery frames accordingly.

According to NAN specification each device of a NAN cluster has a specified master preference value. The specification suggests that moving device should select a low Master Preference value and low mobility devices should select a high Master Preference value. Especially, devices with static location may be considered as infrastructure devices which are suggested to select a value of 128 or greater as their master preference value, and other devices should select a value below 128. In an embodiment, the NAN devices of the cluster having a master preference value over 128 may be configured to offer the ranging service.

Typically, each NAN cluster there is one NAN device which is the Anchor Master of the cluster. In an embodiment, the Anchor Master of the cluster is configured to offer the ranging service to the NAN devices joining the cluster.

Figure 3:
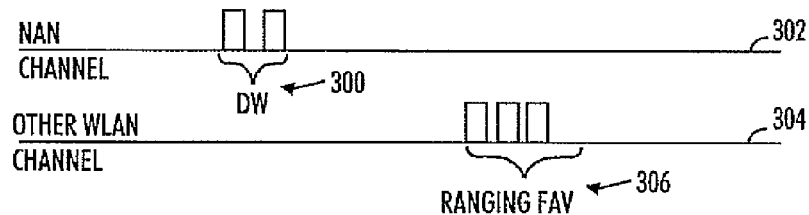
FIG. 3 illustrates an example of transmission of a Discovery Window DW and further availability FAV.

The NAN device joining the cluster may deduce from the ranging service indication the time when the device transmitting the indication is available for ranging (hereafter denoted as further availability or FAV). FIG. 3 illustrates an example, where the device transmitters the indication using a Discovery Window (DW) 300 on the NAN channel 302, where the ranging FAV is advertised. Later, the actual ranging process may be performed in another channel 304, in the ranging FAV 306. All the devices of the cluster may hear the frames in the DW and therefore also know to listen during the ranging FAV. In an embodiment, the actual ranging process may be performed on the same channel (NAN channel).

Figure 4:
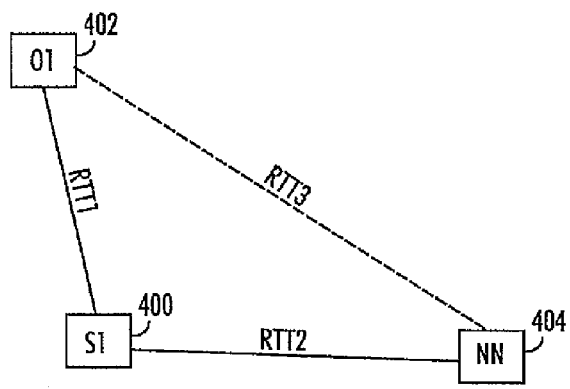
FIG. 4 illustrates an example of a cluster of apparatuses.
Figure 5:
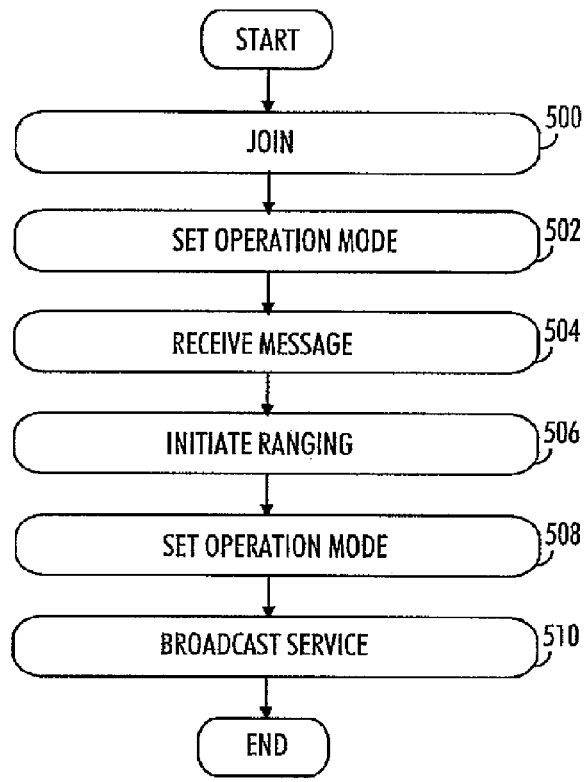
FIG. 5 is a flow chart illustrating an example of an embodiment.
Figure 6:
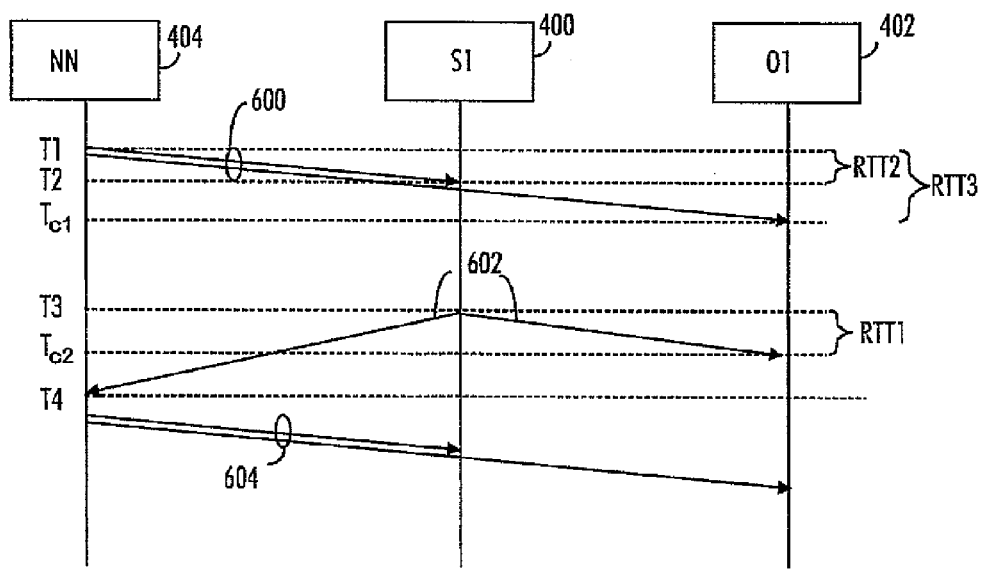
FIG. 6 is a signaling charts illustrating an example of an embodiments.

Next an embodiment is illustrated with the aid of FIGS. 4, 5 and 6. In following, NAN devices offering ranging service are denoted as static nodes, NAN devices only listening (or observing) are denoted as observing nodes and the NAN device joining cluster is denoted as new node.

In an embodiment, the observing nodes [O1, O2, O3, . . . , On] monitor the ranging process between the new node and static nodes [S1, S2, S3, . . . , Sn] to get the distance to the new node for both static and observing nodes. FIG. 4 presents a simplified example scenario, where the ranging process is performed. The example scenario of FIG. 4 contains one static node S1 400, only one observer O1 402, and a new node NN 404, for the sake of simplicity. FIG. 5 is a flow chart illustrating the example.

In step 500, the new node 404 joins the cluster according to known NAN procedures.

In the example case, the roundtrip-time RTT1 is already known by the observer O1 as it has earlier performed ranging against S1. S1 is a node that is known or assumed to have somewhat static position and may be e.g. mains powered. In this example, S1 may be the Anchor Master of the cluster. Node S1 is configured to publish a service ID with further availability FAV. It is thus configured to transmit on Discovery Window advertising ranging FAV. The FAV may define a time and frequency when the S1 is ready to respond to ranging messages.

In step 502, the node 404 sets a first predetermined operating mode for the first apparatus after joining the network. In an embodiment, the first predetermined operating mode is a so called new node mode, where the node 404 is configured to respond to messages on Discovery Window of the cluster advertising ranging FAV. It is thus able to do ranging with S1 in the ranging FAV.

In step 504, the node 404 is configured to receive from the node S1 a message indicating a support for a ranging service. The message indicating support for the ranging service may be a beacon, a discovery frame and/or a special message for this purpose.

In step 506, the node 404 is configured to, as a response to the message, initiate a ranging process with the node S1.

In an embodiment, the discovery Window DW may trigger the ranging process on the same frequency channel used in the transmission of the DW. In this case there is no need to indicate a different frequency when advertising ranging FAV.

FIG. 6 is a signalling chart illustrating an example of the ranging process.

The new node NN 404 is configured to transmit a measurement frame 600 at time instant T1 to the node S1 400. The measurement frame is received by the node at time instant T2, the elapsed time being RTT2. The measurement frame is also received by the observing node O1 402 at time instant Tc1. In the figure Tc1 is later than T2, but in reality the order may naturally be different. The difference Tc1−T1 is denoted as RTT3.

The node S1 is configured to transmit acknowledgement frame 602 at time instant T3. The acknowledgement frame is received by the new node NN at time instant T4 and by the observing node O1 at time instant Tc2.

The new node NN is configured to transmit measurement report 604 comprising T1, T4 and RTT2. The measurement report is received by the node S1 and observing node O1.

As a result of the ranging process, the new node NN will get the RTT2 estimate between the new node and the node S1. On the basis of RTT2 the distance may be calculated by multiplying it with the speed of light.

Returning to the flow chart of FIG. 5, in step 508, the node 404 is configured to set a second predetermined operating mode for the node after completing the ranging process with the node S1. In an embodiment, the second predetermined operating mode is a so called old node mode, where there is no need to respond to the ranging FAV advertisements.

In step 510, the node 404 is configured to broadcast a range-limited service discovery frame.

The process ends.

The observer node O1 listens and receives all communication between the new node NN and the node S1 during the ranging process. It is also configured to record the time stamps related to the measurement and acknowledgement frames. When the ranging process has finished, the observing node may be configured to determine RTT between the new node NN and the observing node O1 for example utilising the equation:

$$RTT3=T4-T1-Tc2+Tc1-RTT2+RTT1.$$

The distance between the new node NN and the observing node O1 may be calculated on the basis of RTT3 by multiplying it with the speed of light.

As the observing node O1 is now aware of the distance between the new node NN and the observing node is capable of determining whether to utilise a range-limited services advertised by the new node.

On the basis of the above ranging service the new node NN may quickly get responses to range-limited service discovery frames when accessing a NAN cluster, without needing to perform first one-to-one ranging with each member of the NAN cluster. This enables the new node to get access some a range-limited service quickly. The new node may perform normal one-to-one ranging with the nodes of the cluster at some phase later, when there is suitable time. This way the service discovery with range limit may be started immediately.

All the nodes of the cluster may be configured to listen the message exchange during the ranging process. If successfully receiving the messages, they may get their range estimate to the new node. In an embodiment, the new node NN may also perform ranging to more than one node transmitting indication of ranging service to make the measurement more reliable by averaging the ranging results.

Figure 7:
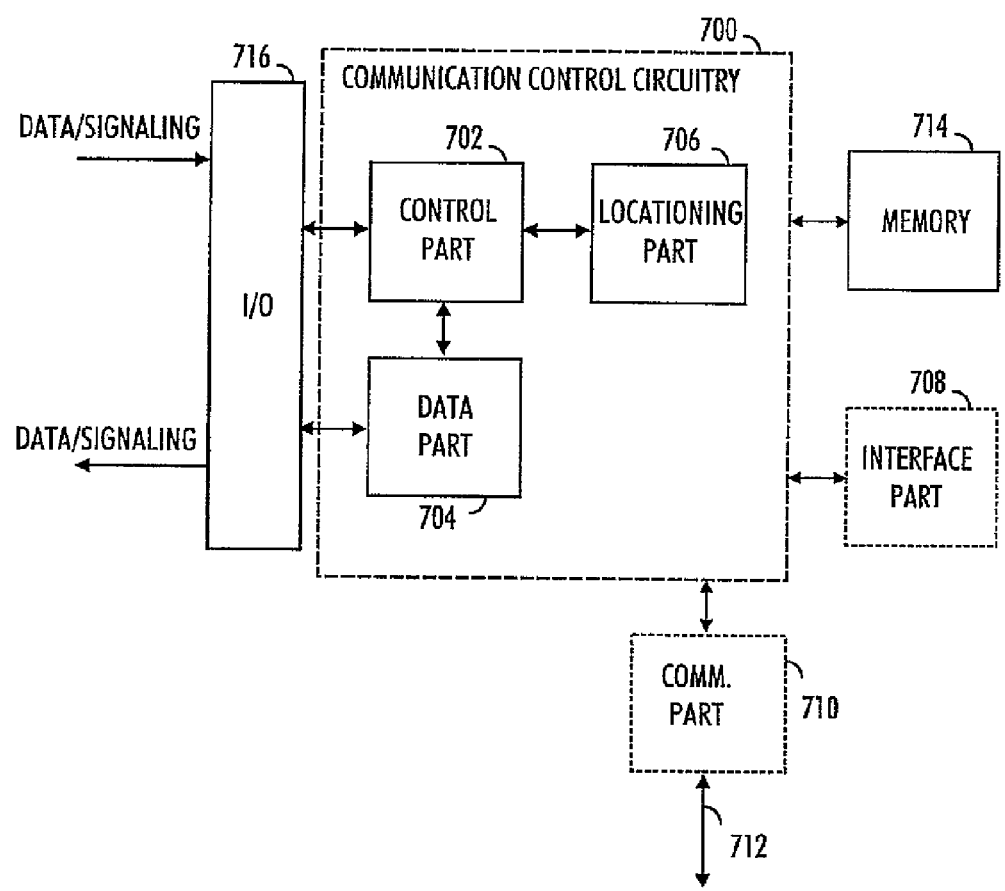
FIG. 7 illustrates a block diagram of an apparatus according to some embodiments.

FIG. 7 illustrates an embodiment of an apparatus comprising means for carrying out the above-mentioned functionalities. In an embodiment, the apparatus may be a wireless device which complies with specifications of an IEEE 802.11 based network or another wireless network. The wireless apparatus may also be, a cognitive radio apparatus capable of adapting its operation to a changing radio environment, e.g. to changes in parameters of another system on the same frequency band. The wireless apparatus may be or may be comprised in a computer (PC), a laptop, a tablet computer, a cellular phone, a palm computer, a base station with routing functionalities, or any other apparatus provided with radio communication capability. In an embodiment, the apparatus carrying out the above-described functionalities is comprised in such a wireless device, e.g. the apparatus may comprise a circuitry, e.g. a chip, a processor, a micro controller, or a combination of such circuitries in the wireless device.

Referring to FIG. 7, the apparatus may comprise a communication controller circuitry 700 configured to control wireless communications in the wireless device. The communication controller circuitry 700 may comprise a control part 702 handling control signalling communication with respect to transmission, reception, and extraction of control or management frames including the beacon frames, initial link setup frames, measurement frames and acknowledgement frames, for example. The communication controller circuitry 700 may further comprise a data part 704 that handles transmission and reception of payload data during transmission opportunities of the wireless device (transmission) or transmission opportunities of other wireless devices (reception).

The communication controller circuitry 700 may further comprise a locationing part 706 configured to control operations related to locationing messages and determining distances to nearby apparatuses on the basis of messages. In an embodiment, the control part 702 forwards information related to locationing messages to the locationing part 706.

In an embodiment, the communication channel utilized by the apparatus is a wireless local area network channel. In an embodiment, the communication channel is defined by a center frequency and a channel width. In an embodiment, the communication channel has a 20 Mhz channel width. In an embodiment, the communication channel is a primary channel according to IEEE 802.11 specs, e.g. IEEE 802.11-2012.

The apparatus may further comprise a user interface 708 enabling interaction with the user of the communication device. The user interface may comprise a display, a keypad or a keyboard, a loudspeaker, etc.

If the apparatus is an infrastructure device or an access point, the apparatus may further comprise a communication part 710 configured to communicate 712 with other network elements such as other access points, network controllers and networks.

The circuitries 702 to 706 of the communication controller circuitry 700 may be carried out by the one or more physical circuitries or processors. In practice, the different circuitries may be realized by different computer program modules. Depending on the specifications and the design of the apparatus, the apparatus may comprise some of the circuitries 702 to 706 or all of them.

The apparatus may further comprise the memory 714 that stores computer programs (software) configuring the apparatus to perform the above-described functionalities of the access point. The memory 714 may also store communication parameters and other information needed for the wireless communications within a wireless network of the access point and with other wireless networks.

The apparatus may further comprise radio interface components 716 providing the apparatus with radio communication capabilities within its wireless network and/or with other wireless networks. The radio interface components 716 may comprise standard well-known components such as an amplifier, filter, frequency-converter, (de)modulator, and encoder/decoder circuitries and one or more antennas.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a wireless device.

The processes or methods described in FIGS. 2 to 6 may also be carried out in the form of a computer process defined by a computer program. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless networks defined above but also to other suitable wireless communication systems. The protocols used, the specifications of wireless networks, their network elements and terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
    joining, by a first apparatus, a network comprising a set of apparatuses;
    setting an operating mode to a first predetermined operating mode for the first apparatus after joining the network;
    receiving, by the first apparatus, from a second apparatus belonging to the network a message indicating a support for a ranging service from the second apparatus;
    in response to receiving the message, initiating, by the first apparatus, a ranging process with the second apparatus if and only if the operating mode is set to the first predetermined operating mode, wherein initiating the ranging process comprises transmitting a request to initiate a distance measurement between the first apparatus and the second apparatus, and wherein the ranging process comprises determining a distance between the first apparatus and the second apparatus based on time stamps of frames transferred, after receiving the message, between the first apparatus and the second apparatus;
    setting, by the first apparatus, the operating mode to a second predetermined operating mode for the first apparatus after completing the ranging process with the second apparatus; and
    broadcasting, by the first apparatus, a range-limited service discovery frame.

2. The method of claim 1, wherein the message comprises indication of a time and channel the ranging service is offered.

3. The method of claim 1, further comprising:
    receiving from a third apparatus belonging to the network a second message indicating a support for a ranging service from the third apparatus; and
    in response to receiving the second message, initiating a ranging process with the third apparatus.

4. The method of claim 1, wherein the message triggers the ranging process on the same channel the message was transmitted on.

5. The method of claim 1, further comprising:
    performing one-to-one ranging process with apparatuses belonging to the network after broadcasting the range-limited service discovery frame.

6. An apparatus comprising:
    at least one processor and at least one memory including computer program code, the at least one non-transitory memory and the computer program code configured to, with the at least one processor, cause the apparatus at least to:
    join network comprising a set of apparatuses;
    set an operating mode to a first predetermined operating mode for the apparatus after joining the network;
    receive from a second apparatus belonging to the network a message indicating a support for a ranging service from the second apparatus;
    in response to receipt of the message, initiate a ranging process with the second apparatus if and only if the operating mode is set to the first predetermined operating mode, wherein initiation of the ranging process comprises transmitting a request to initiate distance measurement between the first apparatus and the second apparatus, and wherein the ranging process comprises determination of a distance between the first apparatus and the second apparatus based on time stamps of frames transferred, after receiving the message, between the first apparatus and the second apparatus;
    set the operating mode to a second predetermined operating mode for the apparatus after completion of the ranging process with the second apparatus; and
    broadcast a range-limited service discovery frame.

7. The apparatus of claim 6, the at least one non-transitory memory and the computer program code, with the at least one processor, further configured to;
   detect, from the message, indication of a time and channel the ranging service is offered.

8. The apparatus of claim 6, the at least one non-transitory memory and the computer program code, with the at least one processor, further configured to:
   receive from a third apparatus belonging to the network a message indicating a support for a ranging service from the third apparatus;
   in response to receiving the message, initiate a ranging process with the third apparatus.

9. The apparatus of claim 6, the at least one non-transitory memory and the computer program code, with the at least one processor, further configured to: initiate on the basis of the message the ranging process on the same channel the message was transmitted on.

10. The apparatus of claim 6, the at least one non-transitory memory and the computer program code, with the at least one processor, further configured to:
    perform one-to-one ranging process with apparatuses belonging to the network after broadcasting the range-limited service discovery frame.

11. A computer program product embodied on a non-transitory distribution medium readable by a computer and comprising program instructions which, when loaded into an apparatus, cause the apparatus to:
    join a network comprising a set of apparatuses;
    set an operating mode to a first predetermined operating mode for the first apparatus after joining the network;
    receive from a second apparatus belonging to the network a message indicating a support for a ranging service from the second apparatus;
    in response to receipt of the message, initiate a ranging process with the second apparatus if and only if the operating mode is set to the first predetermined operating mode, wherein initiation of the ranging process comprises transmitting a request to initiate distance measurement between the first apparatus and the second apparatus, and wherein the ranging process comprises determination of a distance between the first apparatus and the second apparatus based on time stamps of frames transferred, after receiving the message, between the first apparatus and the second apparatus;
    set the operating mode to a second predetermined operating mode for the first apparatus after completion of the ranging process with the second apparatus; and
    broadcast a range-limited service discovery frame.

12. The computer program product of claim 11, wherein the message comprises indication of a time and channel the ranging service is offered.

13. The computer program product of claim 11, wherein the apparatus is further caused to:
    receive from a third apparatus belonging to the network a second message indicating a support for a ranging service from the third apparatus; and
    in response to the second message, initiate a ranging process with the third apparatus.

14. The computer program product of claim 11, wherein the message triggers the ranging process on the same channel the message was transmitted on.

15. The computer program product of claim 11, wherein the apparatus is further caused to:
    perform one-to-one ranging process with apparatuses belonging to the network after broadcasting the range-limited service discovery frame.

* * * * *